(12) United States Patent
Boersma et al.

(10) Patent No.: US 8,332,453 B2
(45) Date of Patent: Dec. 11, 2012

(54) SHIFTER WITH ALL-ONE AND ALL-ZERO DETECTION USING A PORTION OF PARTIALLY SHIFTED VECTOR AND SHIFT AMOUNT IN PARALLEL TO GENERATED SHIFTED RESULT

(75) Inventors: Maarten Boersma, Holzgerlingen (DE); Silvia Melitta Mueller, Altdorf (DE); Jochen Preiss, Boeblingen (DE); Holger Wetter, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 1035 days.

(21) Appl. No.: 12/331,702

(22) Filed: Dec. 10, 2008

(65) Prior Publication Data
US 2010/0146023 A1 Jun. 10, 2010

(51) Int. Cl.
*G06F 7/00* (2006.01)
(52) U.S. Cl. ........ 708/620; 708/205; 708/209; 708/505; 708/501
(58) Field of Classification Search .......... 708/205, 708/209, 505, 501, 620
See application file for complete search history.

(56) References Cited

U.S. PATENT DOCUMENTS

| | | | | |
|---|---|---|---|---|
| 5,726,927 A * | 3/1998 | Wolrich et al. | | 708/620 |
| 6,099,158 A * | 8/2000 | Gorshtein et al. | | 708/505 |
| 6,697,832 B1 * | 2/2004 | Kelley et al. | | 708/501 |
| 7,346,643 B1 * | 3/2008 | Ho et al. | | 708/501 |
| 7,599,981 B2 * | 10/2009 | Ekner et al. | | 708/625 |
| 8,024,393 B2 * | 9/2011 | Ho et al. | | 708/501 |

OTHER PUBLICATIONS

Oklobdzija, Vojin G, et al., "High-performance Energy-efficient Microprocessor Design", Chapter 8—Binary floating-point unit design: the fused multiply-add dataflow Eric Schwarz.
Son Dao Trong, et al., "P6 Binary Floating-Point Unit".

* cited by examiner

*Primary Examiner* — Tammara Peyton
(74) *Attorney, Agent, or Firm* — Cantor Colburn LLP; John Campbell

(57) ABSTRACT

A shifter that includes a plurality of shift stages positioned within the shifter, and receiving and shifting input data to generate a shifted result, and a detection circuit coupled at an input of a final shift stage of the plurality of shifters, in a final stage within the shifter. The detection circuit receives a partially shifted vector at the input of the final shift stage along with a predetermined shift amount, and performing an all-one or all-zero detection operation using a portion of the partially shifted vector and the predetermined shift amount, in parallel, to a shifting operation performed by the final shift stage to generate the shifted result.

15 Claims, 9 Drawing Sheets

| nrm_frac index: | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|---|
| nsha(3:5) | | | | | | | | | | | | | | | | | | | | | | | | | | | | |
| 0 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 |
| 1 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 |
| 2 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 |
| 3 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 |
| 4 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 |
| 5 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 |
| 6 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 |
| 7 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 |

FIG. 5

| a0 a1 a2 | y0 y1 y2 y3 y4 y5 y6 y7 |
|---|---|
| 000 | 1 0 0 0 0 0 0 0 |
| 001 | 0 1 0 0 0 0 0 0 |
| 010 | 0 0 1 0 0 0 0 0 |
| 011 | 0 0 0 1 0 0 0 0 |
| 100 | 0 0 0 0 1 0 0 0 |
| 101 | 0 0 0 0 0 1 0 0 |
| 110 | 0 0 0 0 0 0 1 0 |
| 111 | 0 0 0 0 0 0 0 1 |

FIG. 6
PRIOR ART

| a0 a1 a2 | y0 y1 y2 y3 y4 y5 y6 |
|---|---|
| 0 0 0 | 0 0 0 0 0 0 0 |
| 0 0 1 | 1 0 0 0 0 0 0 |
| 0 1 0 | 1 1 0 0 0 0 0 |
| 0 1 1 | 1 1 1 0 0 0 0 |
| 1 0 0 | 1 1 1 1 0 0 0 |
| 1 0 1 | 1 1 1 1 1 0 0 |
| 1 1 0 | 1 1 1 1 1 1 0 |
| 1 1 1 | 1 1 1 1 1 1 1 |

FIG. 7
PRIOR ART

SHIFTER WITH ALL-ONE AND ALL-ZERO DETECTION USING A PORTION OF PARTIALLY SHIFTED VECTOR AND SHIFT AMOUNT IN PARALLEL TO GENERATED SHIFTED RESULT

STATEMENT OF GOVERNMENT INTEREST

This invention was made with Government support under Contract No.: HR0011-07-9-0002 awarded by DARPA. The Government has certain rights to this invention.

BACKGROUND

The present invention relates to performing an all-one-check or all-zero-check on a vector being shifted, in parallel to a final shifter stage of a shifter. For example, the present invention is useful for carry signal computation for a floating point rounder within a floating point unit (FPU) of a microprocessor, and more specifically, to pre-computing carry signals for a rounder, in parallel to a final normalization stage, for example, of the FPU, to thereby improve the performance of the rounder.

A fused multiply-add type FPU of a microprocessor typically includes an aligner, a multiplier, an adder, a normalizer and a rounder, for example. Conventionally, in a fused multiply-add pipeline of an FPU, after computing an intermediate result of a floating point operation, the normalizer normalizes the intermediate result by shifting out leading zeros. The normalized result is rounded by the rounder. FIG. 1 illustrates a conventional two-stage normalizer within an FPU.

As shown in FIG. 1, a normalizer 10 includes a series of 8:1 multiplexers which perform shifts of different amounts to shift out the number of leading zeros. The series of multiplexers includes a first normalization shifter 12 at a first stage and a second normalization shifter 14 at a second stage. The number of leading zeros is computed outside of the data path, for example using a Leading Zero Anticipation (LZA) circuit, and a 6-bit normalizer shift amount (nsha) is applied to the first and second normalization shifters 12 and 14 via a plurality of 3-to-8 decoders 16a and 16b. Typically, input data of a data width of 118 bits is input into the first normalization shifter 12 and the first stage is addressed by the upper three bits of nsha (i.e., nsha<0:2>) and the second stage is addressed by the lower three bits of nsha (i.e., nsha<3:5>) as shown in FIG. 1. In the first stage, coarse shift amounts are performed to reduce the width of the dataflow to 62 bits (i.e., f2<0:61>). Then, in the second stage, fine shift amounts are performed to shift it into the final position resulting in a normalization fraction of 55 bits (i.e., nrm_frac <0:54>). The results of the normalizer 10 are forwarded to a normalizer result register 18 and then input into a rounder 20. The rounder 20 typically includes an incrementer and rounds between the two closest machine representable numbers to the actual value. The two closest numbers include either the truncated intermediate result or the truncated intermediate result incremented in the least significant bit (LSB). The rounder 20 may include two fraction incrementers having a high incrementer starting at a single precision LSB and a low incrementer starting at a double precision LSB. For double precision results, the carry out of the low incrementer ripples into the high incrementer. The carry out of the high incrementer indicates that the exponent needs to be incremented.

There is a need to be able to provide a shorter back-to-back latency for the floating point unit.

SUMMARY

The present invention provides a shifter and a method for performing an all-one or all-zero detection operation on a vector being shifted, in parallel to a final shifter stage of the shifter.

According to one embodiment, the present invention discloses pre-computing carry signals for the rounder in parallel to a final normalization stage of a normalizer within an FPU. Therefore, the incrementer does not need to compute these carry signals, and the computation of the carry signals is no longer on a critical path.

According to one embodiment of the present invention, a shifter for a floating point unit of a data processor is provided. The shifter includes a plurality of shift stages positioned within the shifter, and receiving and shifting input data to generate a shifted result, and a detection circuit coupled at an input of a final shift stage of the plurality of shift stages, and receiving a partially shifted vector at the input of the final shift stage along with a predetermined shift amount, and performing an all-one or all-zero detection operation using a portion of the partially shifted vector and the predetermined shift amount, in parallel, to a shifting operation performed by the final shift stage to generate the shifted result.

According to another embodiment, a method of performing an all-one or all-zero detection operation within a shifter is provided. The method includes receiving and shifting input data via a plurality of shift stages positioned within the shifter, to generate a shifted result, and receiving, via a detection circuit, a partially shifted vector from an input of a final shift stage of the plurality of shift stages and a predetermined shift amount, and performing an all-one or all-zero detection operation, via the detection circuit, using a portion of the partially shifted vector and the predetermined shift amount, in parallel, to a shifting operation performed by the final shift stage to generate the shifted result.

According to another embodiment, a computer program product performing the above-mentioned method is also provided.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 5 is a table illustrating an example of mapping of partially shifted vector (f2) shown in FIG. 2, into the shifted result that can be implemented within embodiments of the present invention.

FIG. 6 is a table illustrating a truth table for a 3-to-8 full decoder that can be implemented within embodiments of the present invention.

FIG. 7 is a table illustrating a truth table for a 3-to-7 half decoder that can be implemented within embodiments of the present invention.

DETAILED DESCRIPTION

Figure 1:
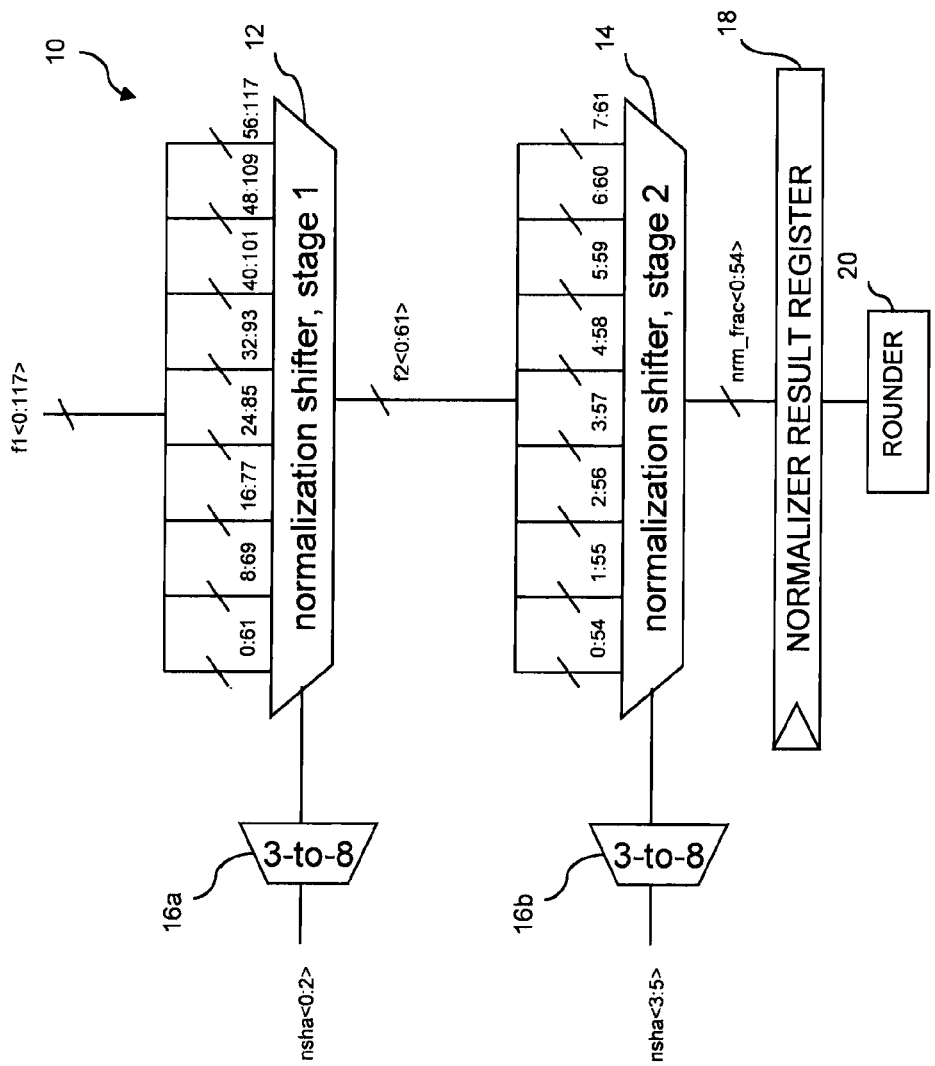
FIG. 1 is a schematic diagram illustrating a conventional two-stage normalizer within a floating point unit (FPU).
Figure 2:
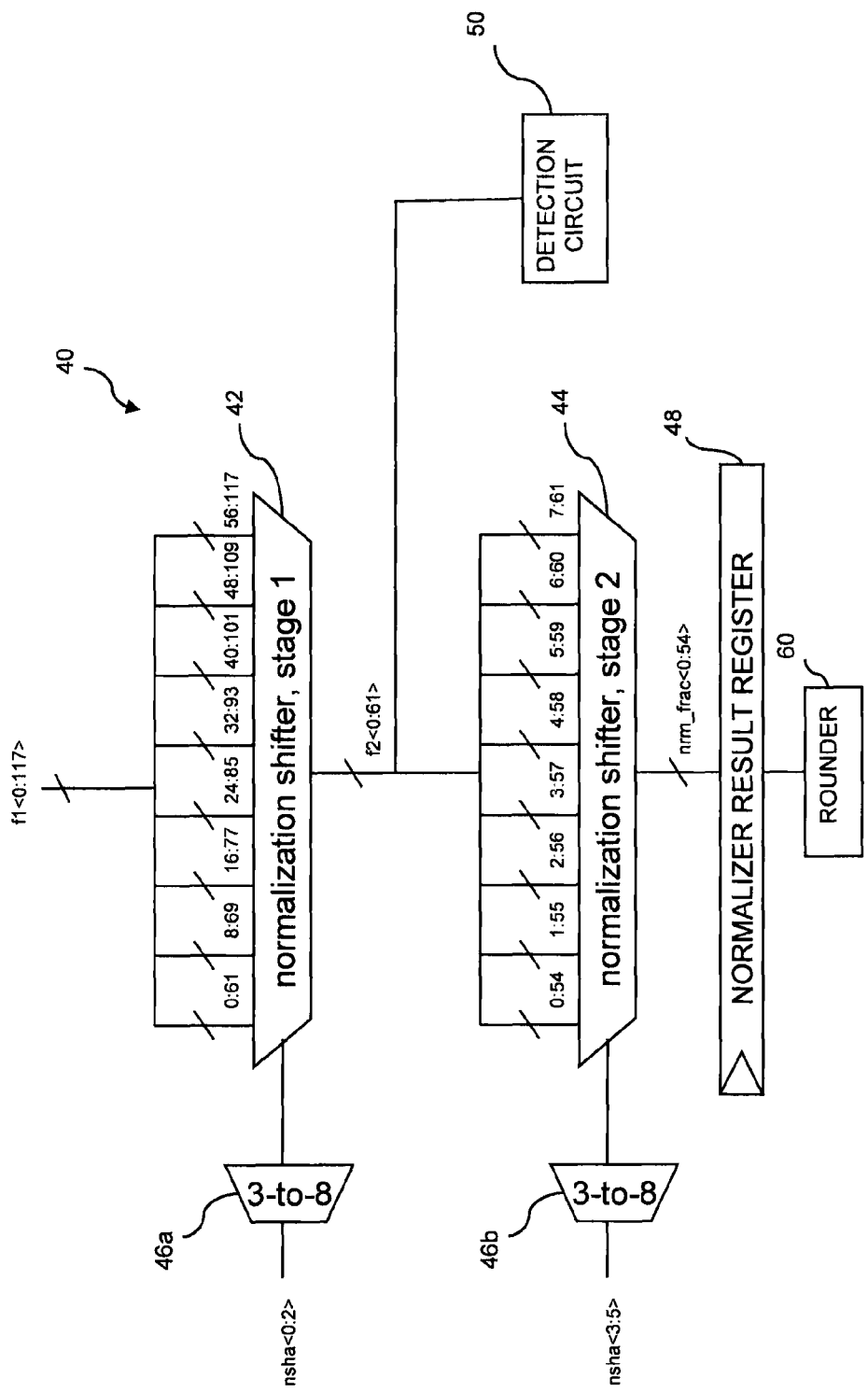
FIG. 2 is a schematic diagram illustrating a shifter including a detection circuit that can be implemented within embodiments of the present invention.

With reference now to FIG. 2, there is a shifter 40 having a plurality of shift stages and receiving and shifting input data to generate a shifted result. The shifter 40 further includes a detection circuit 50 that can be implemented within embodiments of the present invention. According to the current embodiment of the present invention, the shifter 40 is a normalizer, for example. However, the present invention is not limited hereto, and may vary accordingly. As shown in FIG. 2, the shifter 40, i.e., a normalizer 40 including the detection circuit 50 along with a normalizer result register 48, and a rounder 60 are provided. According to an embodiment of the present invention, the normalizer 40 and the detection circuit 50 may be utilized in a floating point unit having a fused multiply-add pipeline, for example. However, the present invention is not limited hereto, and may vary as necessary.

According to one embodiment, the normalizer 40 is a two-stage normalizer including a first shifter i.e., a first normalization shifter 42 at a first stage within the normalizer 40 and a final shift stage i.e., a second normalization shifter 44 at a second stage, in series with the first normalization shifter 42. The present invention is also not limited to a two-stage normalizer, and may vary as necessary. That is, the normalizer 40 may be a three-stage normalizer or a four-stage normalizer, for example. According to an embodiment of the present invention, the first and second normalization shifters 42 and 44 are 8:1 multiplexers which perform shifts of different amounts to shift out a number of leading zeros. Input data of a data width of 118 bits (i.e., f1<0:117>) may be input into the first normalization shifter 42 in the first stage. The number of leading zeros is computed outside of the data path using a leading zero anticipator (LZA) circuit, for example, and a 6-bit normalization shift amount (nsha) is applied to the first and second normalization shifters 42 and 44 via a plurality of 3-to-8 decoders 46a and 46b (a truth table corresponding to the plurality of 3-to-8 decoders 46a and 46b is shown in FIG. 6). The first stage of the normalizer 40 is addressed by the upper three bits of nsha (i.e., nsha<0:2>) via the 3-to-8 decoder 46a and the second stage is addressed by the lower three bits of nsha (i.e., nsha<3:5>) via the 3-to-8 decoder 46b as shown in FIG. 2. In the first stage, coarse shift amounts are performed to reduce the width of the dataflow to 62 bits, for example, thereby outputting a partially shifted vector (e.g., a partially normalized fraction f2<0:61>).

According to an embodiment of the present invention, the detection circuit 50 is coupled to an input of the final shifter 44 and receives a portion of the partially shifted vector f2 and a predetermined shift amount (i.e., the lower three bits of nsha, i.e., nsha<3:5>) and performs an all-one or all-zero detection operation. In this embodiment, the detection circuit 50 determines a carry signal for a normalized fraction result to be generated by the normalizer 40. According to another embodiment, the detection circuit may perform an all-zero detection operation for sticky bit computation needed by the rounder 60, for example as discussed below with reference to FIGS. 8 and 9.

According to an embodiment of the present invention, the normalizer 40 performs a normalization operation while the detection circuit 50 performs an all-one detection operation, in parallel. As shown in FIG. 2, the detection circuit 50 is coupled at an input of the final shifter 44 of the plurality of shifters, in the final stage within the normalizer 40, and receives the partially shifted vector f2 at the input of the final shifter 44 to use for detecting a carry signal while the final shifter 44 shifts the partially shifted vector f2 to produce a normalized fraction result, for example and provides the normalized result to a normalizer result register 48, and then to the rounder 60 to generate a rounded result. Additional details concerning the detection circuit 50 will now be described below with reference to FIG. 3.

Figure 3:
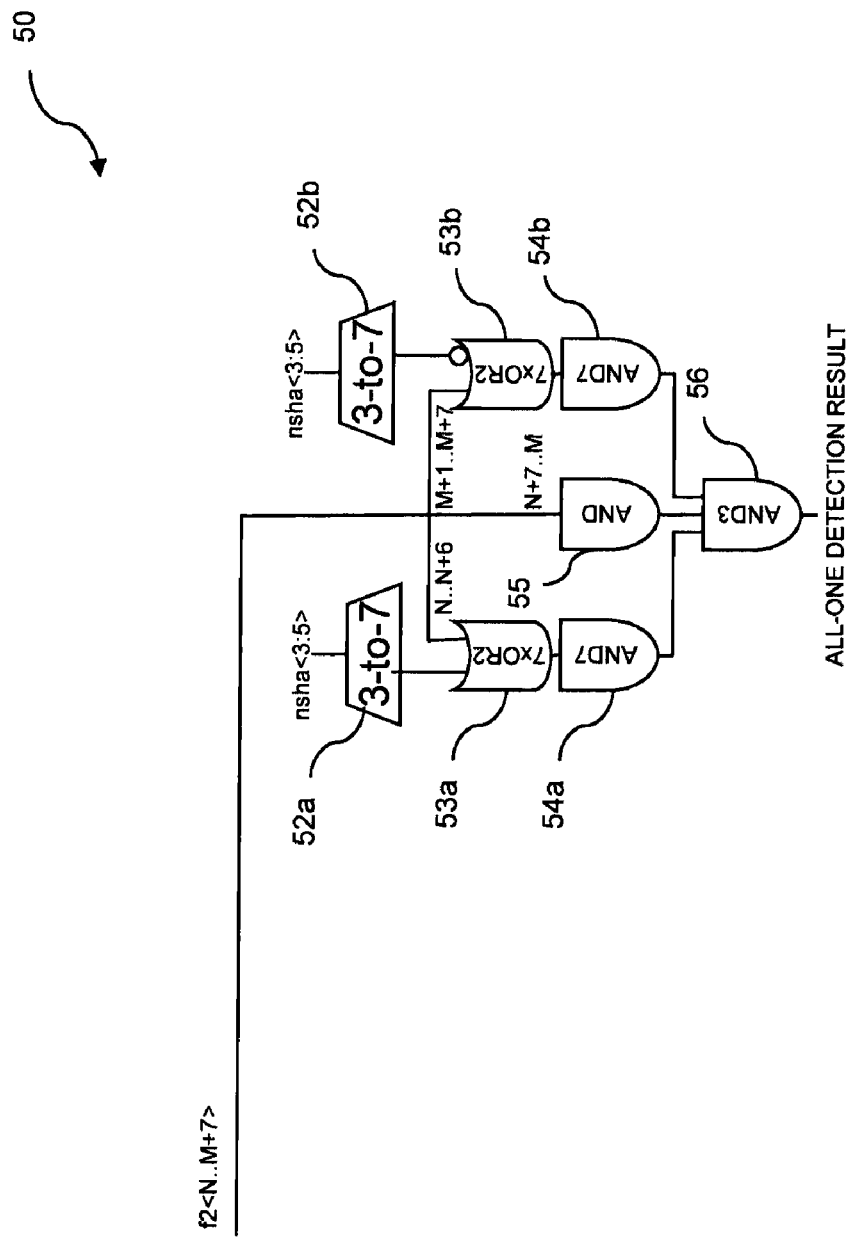
FIG. 3 is a schematic diagram illustrating a detection circuit that can be implemented within embodiments of the present invention

According to an embodiment of the present invention, as shown in FIG. 3, the detection circuit 50 receives a portion of the partially shifted vector (e.g., a partially normalized fraction f2<N . . . M+7>, where the portion of the partially shifted vector f2 is selected based on the requirements of the rounder 60, for example. The detection circuit 50 also receives a predetermined shift amount (i.e., nsha<3:5>) and detects the carry signal using the portion of the partially shifted vector f2 and the predetermined nsha. According to an embodiment of the present invention, the predetermined nsha utilized by the detection circuit 50 is the same lower bits of a shift amount as that input into the final shifter 44.

The detection circuit 50 includes a plurality of 3-to-7 decoders 52a and 52b which receive the predetermined nsha (i.e., nsha<3:5>), a plurality of OR gate banks 53a and 53b each coupled to the outputs of the respective 3-to-7 decoders 52a and 52b and receiving most significant bits (N . . . N+6) and least significant bits (M+1 . . . M+7) of the portion of the partially shifted vector and being controlled by the plurality of 3-to-7 decoders 52a and 52b, based on the predetermined nsha, to select specified bits of the upper and lower bits to be included in the all-one or all-zero detection operation. The detection circuit 50 further includes a plurality of AND reduction networks 54a and 54b coupled to the output of the respective OR gate banks 53a and 53b to receive the output bits of the OR gate banks 53a and 53b, and an AND reduction network 55 which receives remaining bits (N+7 . . . M) between the upper and lower bits of the portion of the partially shifted vector f2. According to one embodiment, these remaining bits (N+7 . . . M) are nsha-independent and the data width of the remaining bits (N+7 . . . M) is based on the data width of the partially normalized fraction f2. These remaining bits (N+7 . . . M) are all included in the all-one or all-zero detection operation performed by the detection circuit. The detection circuit 50 further includes an AND reduction network 56 which receives the outputs from the AND reduction networks 54a, 54b and 55 and combines the respective outputs to detect a carry signal. Other embodiments may implement (parts of) the OR/AND functionality within dynamic register circuits, for example.

According to an embodiment of the present invention, each of the OR gate banks 53a and 53b includes 7 OR gates with 2 inputs and 1 output each, and each AND reduction network 54a and 54b includes 7 inputs and one output (depicted as "AND7"). Further, AND reduction network 55 includes M−(N+7)+1 inputs and one output. For the purposes of illustration only in FIG. 3, the AND reduction networks 54a, 54b and 55 are shown having only one input and one output.

Details regarding the masking and selection operation performed by the 3-to-7 decoders 52a and 52b will now be described with reference to FIGS. 4 and 7.

Figure 4:
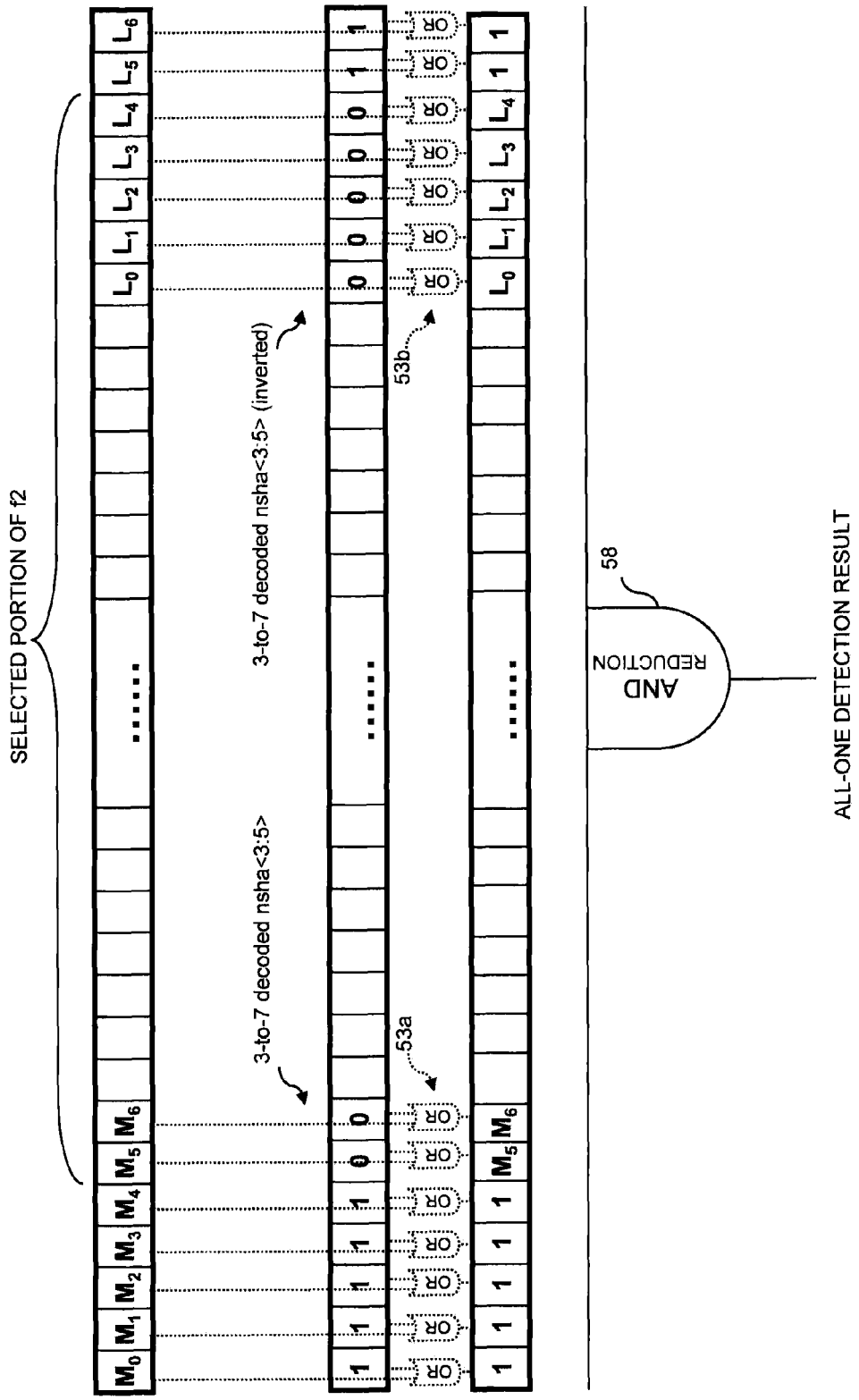
FIG. 4 is a detailed schematic diagram illustrating the masking and selection of relevant bits by a plurality of 3-to-7 decoders of the detection circuit shown in FIG. 3 that can be implemented within embodiments of the present invention.

FIG. 4 illustrates the masking and selection of relevant bits of the upper bits and lower bits via the 3-to-7 decoders 52a and 52b, respectively while FIG. 7 illustrates a truth table corresponding to the 3-to-7 decoders 52a and 52b. In FIG. 4, an example of masking and selection of relevant bits is performed by the 3-to-7 decoders 52a and 52b where the nsha=5 (binary coded as '101') for example. When nsha=5, the output is '1111100' as shown in the table of FIG. 7. In FIG. 4, the decoders 52a and 52b mask the relevant 7 most significant bits and the relevant 7 least significant bits, respectively such that selected bits of the 7 most significant bits and the 7 least significant bits are included in the portion of the partially shifted vector f2 to be considered in the all-one detection operation performed by the detection circuit 50 shown in FIG. 3, for example. Therefore, as shown in FIG. 4, from the most significant bits, the bits $M_5$ and $M_6$ along with from the least significant bits, the bits $L_0$, $L_1$, $L_2$, $L_3$, and $L_4$ are included in predetermined bits to be considered in the all-one detection operation. As shown in FIG. 4, according to one embodiment, when the shifter 40 is a normalizer, the 3-to-7 decoder 52b inverts the output bits as '0000011' because if the output of one of the OR gates contained in OR gate bank 53b is a '1' because its input from the 3-to-7 decoder 52b is a '1', the corresponding fraction bit is not influencing the detected all-one signal. Further, shown in FIG. 4, the outputs of OR gate banks 53a and 53b, along with the remaining bits between upper and lower bits, input into an AND reduction network 58 to perform the all-one detection operation. According to an embodiment of the present invention, the AND reduction network 58 is equivalent to the combination of AND-reduction networks 54a, 54b, 55 and 56 shown in FIG. 3. An example of a mapping of a portion of a partially shifted vector f2<0:61> into a shifted result and performance of an all-one detection operation via the detection circuit 50 will now be described below with reference to FIG. 5.

FIG. 5 is a table illustrating mapping of f2<25:59> into a normalized fraction vector i.e., nrm_frac<25:52>, where N=25 and M=52. As shown in the table, each line corresponds to a different normalization shift amount i.e., nsha for the second normalization shifter 44 at stage 2 of the normalizer 40. According to an embodiment of the present invention, bits 25 to 59 are the portion of the partially normalized fraction f2<0:61> along with the nsha<3:5> used by the detection circuit 50 to perform the all-one detection operation. As shown in the table, bits 32 to 52 are predetermined bits to be included in the all-one detection operation. The upper bits 25 to 31 and the lower bits 53 to 59 are respectively input into the OR gate banks 53a and 53b and the 3-to-7 decoders mask specified bits of the upper bits 25 to 31 and the lower bits 53 to 59, and select remaining bits of the upper and lower bits to be included in the detection of the carry signal. As shown in the table in FIG. 5, if nsha=5 then two of the upper bits (bits 30 and 31) and five of the lower bits (bits 53 through 57) along with the remaining bits (bits 32 through 52) are included in the all-one detection operation. The output of the OR gate banks 53a and 53b are input into the AND reduction networks 54a and 54b and the remaining bits (bits 32 through 52) are input into the AND reduction network 55. The output results of the AND reduction networks 54a, 54b and 55 are then input into the AND reduction network 56 to detect a carry signal.

According to an embodiment, the detection unit 50 may be used to determine carry signals for both low and high incrementers in the case of a mixed precision rounder, for example. As mentioned above, the shifter 40 according to an embodiment of the present invention may include a detection circuit which performs an all-zero detection operation as described below with reference to FIGS. 8 and 9.

Figure 8:
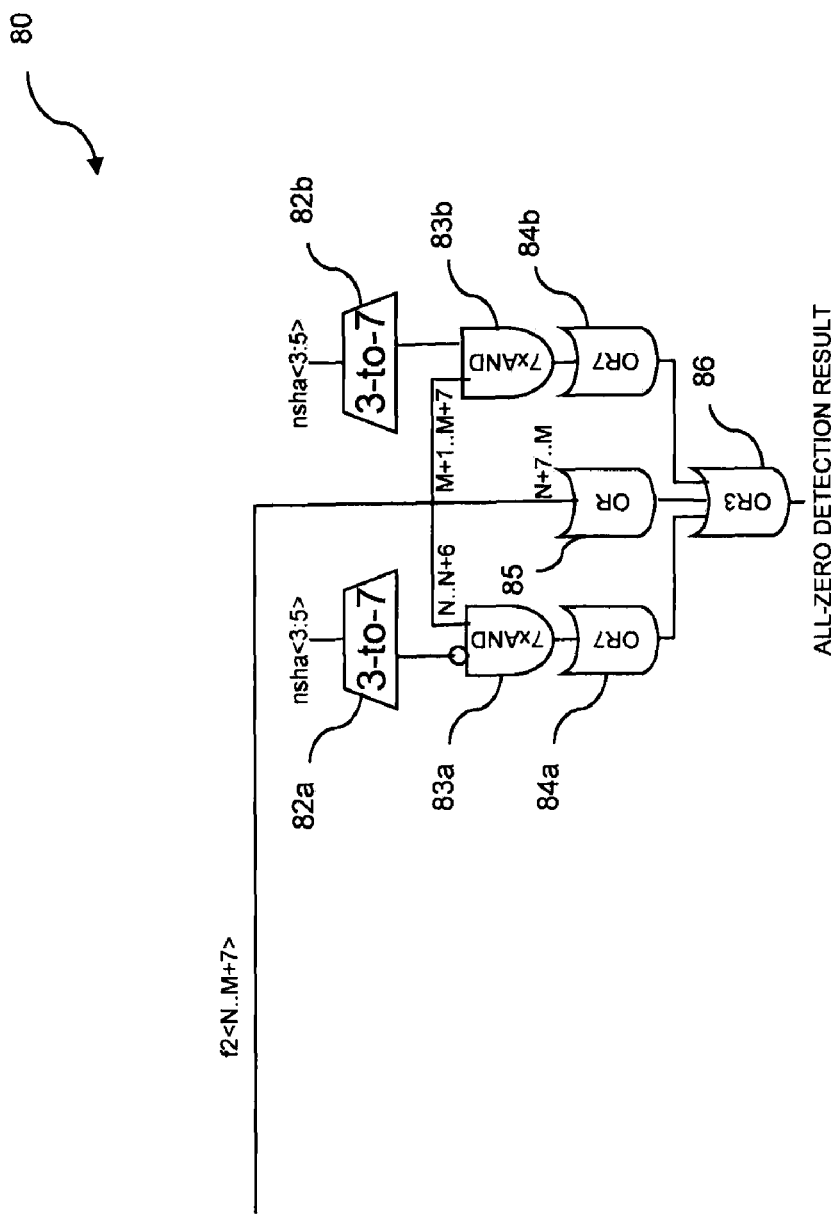
FIG. 8 is a schematic diagram illustrating a detection circuit that can be implemented within alternative embodiments of the present invention.

FIG. 8 illustrates a detection circuit 80 according to an alternative embodiment of the present invention. Some of the features shown in the detection circuit 80 are the same as those shown in the detection circuit 50 (as depicted in FIGS. 3 and 4, for example), therefore, a detailed description of these features has been omitted. As shown in FIG. 8, the detection circuit 80 includes a plurality of 3-to-7 decoders 82a and 82b which receive the predetermined nsha (i.e., nsha<3:5>), a plurality of AND gate banks 83a and 83b each coupled to the outputs of the respective 3-to-7 decoders 82a and 82b and receiving most significant bits (N . . . N+6) and least significant bits (M+1 . . . M+7) of the portion of the partially shifted vector and being controlled by the plurality of 3-to-7 decoders 82a and 82b, based on the predetermined nsha, to select specified bits of the upper and lower bits to be included in the all-zero detection operation. The detection circuit 80 further includes a plurality of OR reduction networks 84a and 84b coupled to the output of the respective AND gate banks 83a and 83b to receive the output bits of the AND gate banks 83a and 83b, and an OR reduction network 85 which receives remaining bits (N+7 . . . M) between the upper and lower bits of the portion of the partially shifted vector f2. According to one embodiment, these remaining bits (N+7 . . . M) are nsha-independent and the data width of the remaining bits (N+7 . . . M) is based on the data width of the partially normalized fraction f2. These remaining bits (N+7 . . . M) are all included in the all-zero detection operation performed by the detection circuit 80. The detection circuit 80 further includes an OR reduction network 86 which receives the outputs from the OR reduction networks 84a, 84b and 85 and combines the respective outputs to generate an all-zero signal.

According to an embodiment of the present invention, each of the AND gate banks 83a and 83b includes 7 AND gates with 2 inputs and 1 output each, and each OR reduction network 84a and 84b includes 7 inputs and one output (depicted as "OR7"). Further, OR reduction network 85 includes M−(N+7)+1 inputs and one output. For the purposes of illustration only in FIG. 8, the OR reduction networks 84a, 84b and 85 are shown having only one input and one output.

Figure 9:
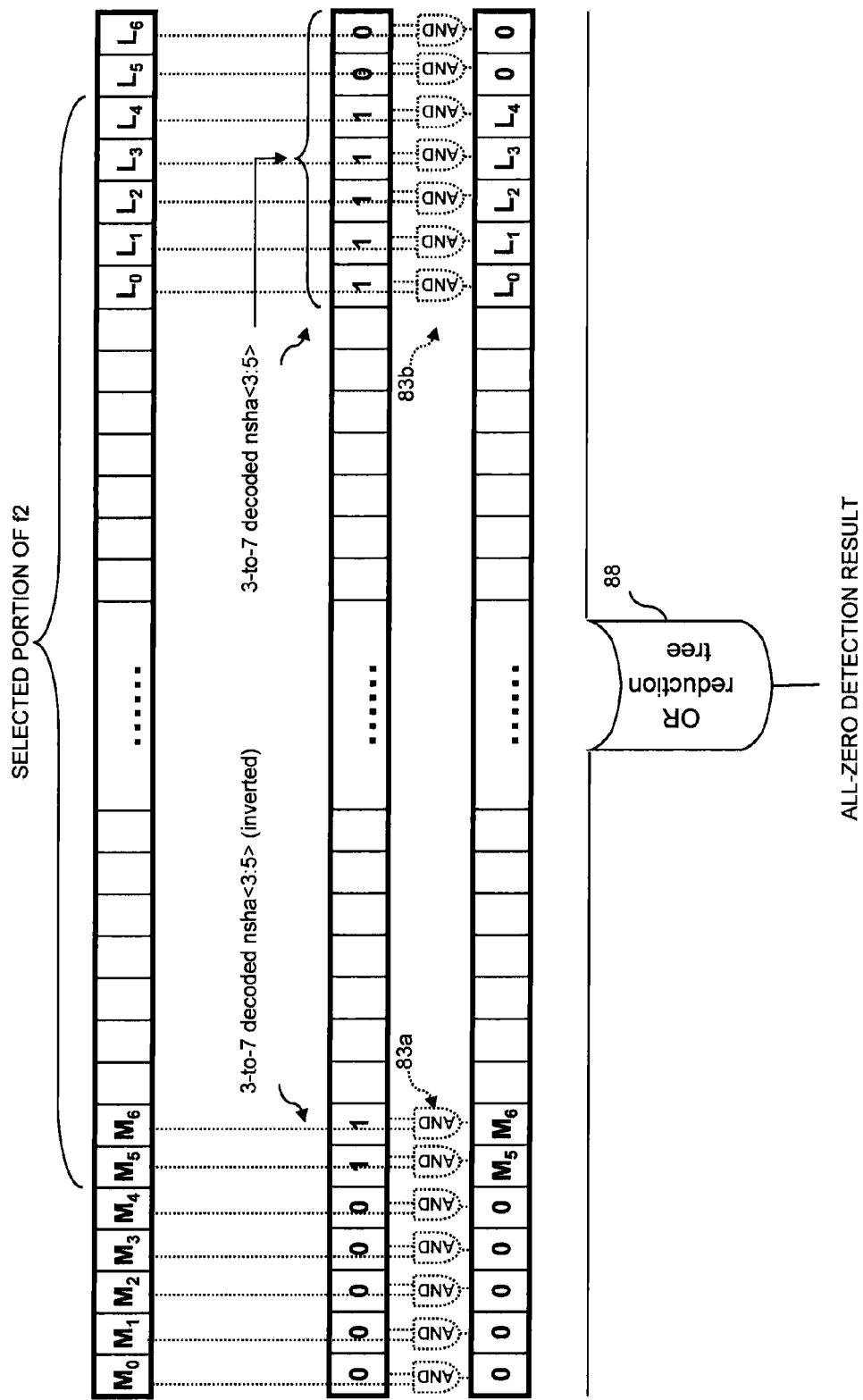
FIG. 9 is a detailed schematic diagram illustrating the masking and selection of relevant bits by a plurality of 3-to-7 decoders of the detection circuit shown in FIG. 8 that can be implemented within alternative embodiments of the present invention.

FIG. 9 illustrates the masking and selection of relevant bits of the upper bits and lower bits via the 3-to-7 decoders 82a and 82b. In FIG. 9, an example of masking and selection of relevant bits is performed by the 3-to-7 decoders 82a and 82b where the nsha=5 (binary coded as '101') for example. In FIG. 9, the decoders 82a and 82b mask the relevant 7 most significant bits and the relevant 7 least significant bits, respectively such that selected bits of the 7 most significant bits and the 7 least significant bits are included in the portion of the partially shifted vector f2 to be considered in the all-zero detection operation performed by the detection circuit 80 shown in FIG. 8, for example. Therefore, as shown in FIG. 9, from the most significant bits, the bits $M_5$ and $M_6$ along with from the least significant bits, the bits $L_0$, $L_1$, $L_2$, $L_3$, and $L_4$ are included in predetermined bits to be considered in the all-zero detection operation. As shown in FIG. 9, according to one embodiment, when the shifter 40 is a normalizer, the 3-to-7 decoder 82a inverts the output bits as '0000011'. Further, shown in FIG. 9, the outputs of AND gate banks 83a and 83b, along with the remaining bits between upper and lower bits, are input into an OR reduction network 88 to perform the all-zero detection operation. According to an embodiment of the present invention, the OR reduction network 88 is equivalent to the combination of OR-reduction networks 84a, 84b, 85 and 86 shown in FIG. 8.

According to embodiments of the present invention, the detection circuit utilizes a portion of the partially shifted vector at an input of a final shift stage of the shifter along with a predetermined shift amount from outside of the data path which are both available earlier than the resulting shifted vector from the final shift stage in stage 2, to detect all ones or all zeros. In the case of a normalizer and rounder, the detection circuit pre-computes carry signals for the subsequent rounder. Therefore, by providing a detection unit within the normalizer, the present invention provides the advantage of determining carry signals early in the pipeline, thereby enabling a shorter back-to-back latency for the floating point unit.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A shifter comprising:
a plurality of shift stages positioned within the shifter, and
a detection circuit coupled to an input of a final shift stage of the plurality of shift stages, the detection circuit comprising a first decoder and a second decoder, a first gate bank coupled to an output of the first decoder, a second gate bank coupled to an output of the second decoder, and a reduction network coupled to the first and second gate banks, the shifter configured to perform a method comprising:
receiving and shifting input data, by the plurality of shift stages, to generate a shifted result;
receiving, by the detection circuit, a partially shifted vector from the input of the final shift stage along with a predetermined shift amount; and
performing, by the detection circuit, an all-one or all-zero detection operation using a portion of the partially shifted vector and the predetermined shift amount, in parallel to a shifting operation performed by the final shift stage to generate the shifted result, the performing comprising:
receiving, by the first and second decoders, the predetermined shift amount;
receiving, by the first and second banks, upper and lower bits of the portion of the partially shifted vector;
controlling the first and second gate banks, by the first and second decoders, to select specified bits of the upper and lower bits to be included in the all-one or all-zero detection operation based on the predetermined shift amount;
receiving, by the reduction network, output bits from the first and second gate banks;
receiving, by the reduction network, remaining bits between the upper and lower bits of the portion of the partially shifted vector; and
detecting, by the reduction network, all-ones or all-zeros based on the received output bits and remaining bits.

2. The shifter of claim 1, wherein operation, the first and second gate banks comprise OR gates and the reduction network comprises an AND-reduction network, and when performing an all-zero detection operation, the first and second gate banks comprise AND gates and the reduction network comprises an OR-reduction network.

3. The shifter of claim 2, wherein the first and second decoders are 3-to-7 half decoders masking specified bits of the upper and lower bits, and selecting remaining bits of the upper and lower bits to be included in the all one or all zero detection operation.

4. The shifter of claim 3, wherein the upper and lower bits respectively include seven most significant bits and seven least significant bits of the portion of the partially shifted vector.

5. The shifter of claim 4, wherein the predetermined shift amount includes the same shift amount as that input into the final shift stage.

6. The shifter of claim 5, wherein the shifter is a normalizer.

7. A method of performing all-one or all-zero detection within a shifter, the method comprising:
receiving and shifting input data, by a plurality of shift stages positioned within the shifter, to generate a shifted result; and
receiving, by a detection circuit, a partially shifted vector from an input of a final shift stage of the plurality of shift stages and a predetermined shift amount; and
performing an all-one or all-zero detection operation, by the detection circuit, using a portion of the partially shifted vector and the predetermined shift amount, in parallel, to a shifting operation performed by the final shift stage to generate the shifted result, the performing comprising:
receiving, by first and second decoders, the predetermined shift amount;

receiving, by first and second gate banks coupled to the first and second decoders, upper and lower bits of the portion of the partially shifted vector;

controlling, by the first and second decoders, the first and second gate banks to select specified bits of the upper and lower bits to be included in the all-one or all-zero detection operation based on the predetermined shift amount;

receiving, by a reduction network coupled to the first and second gate banks, output bits from the first and second gate banks respectively;

receiving, by the reduction network, remaining s between the upper and lower bits of the portion of the partially shifted vector; and detecting, by the reduction network, all-ones or all-zeros based on the received output bits and bits.

8. The method of claim 7, wherein when performing an all-one detection operation, the first and second gate banks comprise OR gates and the reduction network comprises an AND-reduction network, and when performing an all-zero detection operation, the first and second gate banks comprise AND gates and the reduction network comprises an OR-reduction network.

9. The method of claim 8, wherein the first and second decoders are 3-to-7 half decoders, masking specified bits of the upper and lower bits and selecting remaining bits of the upper and lower bits to be included in the all-one or all-zero detection operation.

10. The method of claim 9, wherein the upper and lower bits respectively include seven most significant bits and seven least significant bits of the portion of the partially shifted vector.

11. The method of claim 10, wherein the predetermined shift amount includes the same shift amount as that input into the final shift stage.

12. A computer program product comprising a computer useable medium including a computer readable program, wherein the computer readable program when executed on a computer causes the computer to implement a method for performing an all-one or all-zero detection operation, the method comprising:

receiving and shifting input data, by a plurality of shift stages positioned within a shifter, to generate a shifted result; and receiving, by a detection circuit, a partially shifted vector from an input of a final shift stage of the plurality of shifters and a predetermined shift amount; and performing an all-one or all-zero detection operation, by the detection circuit, using a portion of the partially shifted vector and the predetermined shift amount, in parallel, to a shifting operation performed by the final shift stage to generate the shifted result, the performing comprising receiving, by first and second decoders, the predetermined shift amount;

receiving, by first and second gate banks coupled to the first and second decoders, upper and lower bits of the portion of the partially shifted vector;

controlling, by the first and second decoders, the first and second gate banks to select specified bits of the upper and lower bits to be included in the all-one or all-zero detection operation, based on the predetermined shift amount;

receiving, by a reduction network coupled to the first and second gate banks, output bits from the first and second gate banks;

receiving, by the reduction network, remaining bits between the upper and lower bits of the portion of the partially shifted vector; and detecting all-ones or all-zeros based on the received output bits and remaining bits.

13. The computer program product of claim 12, wherein the first and second decoders are 3-to-7 half decoders, masking specified bits of the upper and lower bits and selecting remaining bits of the upper and lower bits to be included in the all-one or all-zero detection operation.

14. The computer program product of claim 13, wherein the upper and lower bits respectively include seven most significant bits and seven least significant bits of the portion of the partially shifted vector.

15. The computer program product of claim 14, wherein the predetermined shift amount includes the same shift amount as that input into the final shift stage.

* * * * *